United States Patent [19]

Yang

[11] Patent Number: 4,587,382

[45] Date of Patent: May 6, 1986

[54] ECHO CANCELLER USING END DELAY MEASUREMENT

[75] Inventor: Sung M. Yang, Newark, Calif.

[73] Assignee: GTE Lenkurt Incorporated, Phoenix, Ariz.

[21] Appl. No.: 403,171

[22] Filed: Jul. 29, 1982

[51] Int. Cl.⁴ .............................................. H04B 3/20
[52] U.S. Cl. ................................................. 179/170.2
[58] Field of Search .............. 179/170.2, 170.8, 170.6; 364/724, 825, 728; 333/116

[56] References Cited

U.S. PATENT DOCUMENTS

| | | | |
|---|---|---|---|
| 3,535,473 | 10/1970 | Flanagan et al. | 179/170.2 |
| 3,721,777 | 3/1973 | Thomas | 179/170.2 |
| 3,860,768 | 1/1975 | Wehrmann | 179/170.2 |
| 4,024,357 | 5/1977 | Sourgens et al. | 179/170.2 |
| 4,363,938 | 12/1982 | Daaboul et al. | 179/170.2 |

OTHER PUBLICATIONS

S2816 Preliminary Disclosure, American Microsystems Inc., Jul. 1981.

Primary Examiner—Gene Z. Rubinson
Assistant Examiner—R. Vaas
Attorney, Agent, or Firm—Leonard R. Cool; Russell A. Cannon

[57] ABSTRACT

An echo canceller is connected in the four-wire, voice-frequency path of a communication circuit and includes an end delay analyzer which is bridged between the four-wire transmit and receive paths, and a variable delay and an echo synthesizer connected in series between the received signal path and one input of a summation circuit. The other input to the summation circuit is connected to the four-wire transmit path along which the return echo signal is propagating. Any difference appears as a residual echo at the output of the summation circuit.

The end delay analyzer, in response to the received signal and the echo return signal, provides an output control signal that adjusts the variable delay to compensate for the terminal circuit delay which occurs between the echo canceller and the four-wire to two-wire hybrid. This inserts delay in the received signal, which is applied to the echo synthesizer, thus simplifing the echo synthesizer structure as the variable component now must only compensate for the active part of the impulse response of the terminal circuit.

8 Claims, 7 Drawing Figures

ECHO CANCELLER USING END DELAY MEASUREMENT

FIELD OF THE INVENTION

This invention relates to the suppression of echos in communication channels and more particularly to the reduction of echo amplitude without interruption of the transmission paths.

BACKGROUND DESCRIPTION

Most anyone who has used a communication circuit, and in particular telephone communication circuits, has experienced the effect of echo. An echo is a delayed reproduction of the original sound eminating from the speaker or signal generating device. In communication circuits, echos occur when electrical signals encounter imperfectly matched impedance junctions and, as a result, a portion of the signal is reflected back to the talker. Because these reflected signals require a finite travel time, the reflected signal is heard as an echo rather than sidetone. As distances increase the reflected signal takes longer and longer to reach the talker and the echo becomes more and more annoying. For reasonably short distances, where the delay is in the tens of milliseconds, such as might be encountered for transcontinental telephone calls in the United States, control of the echo may be obtained by opening the return circuit path, thereby preventing the reflected signal from returning to the talker. Although this is somewhat annoying, because responses from the listener may be blocked, thus preventing an appearance of face to face communication, effective communication can be obtained and thus the slight inconviences introduced by this technique are usually tolerated.

With the introduction of satellite communications the delay times are increased from tens of milliseconds to hundreds of milliseconds and interruption of a circuit path does not provide an effective solution to the two-way voice communication problem. In an article entitled "A 12-Channel Digital Echo Canceller", Donald L. Duttweiler, IEEE Transactions on Communications, COM-26, No. 5, May 1978, pp 647–653, it is pointed out that there is a delay of approximately 270 milliseconds in each path of a four-wire synchronous satellite circuit. Thus, the round-trip, or echo-path, delay exceeds one-half second. Because of this long echo-path delay two problems are encountered. The first is that any interruption of the transmission paths, such as by use of an echo suppressor, would preclude effective two-way communication between the parties to the telephone conversation. Second, the effect of the echo delay would be intolerable because it would severely affect the speaker's ability to communicate. For these reasons echo cancellers were introduced in order to reduce the amplitude of the echo signal and to permit effective two-way communication over satellite circuits.

Echo Cancellers usually employ a transversal filter or a finite impulse response (FIR) filter. It is known that the complexity of the echo canceller is proportional to the number of taps used in the transversal filter and the sampling frequency. Even for the terrestrial circuits the number of taps for prior art devices may be quite high. For example, a 384 tap echo canceller is not uncommon. Such a device would need to perform 3,072,000 multiplications per second, i.e., 8 kHz×384, for a normal voice channel. Furthermore the residual echo after cancellation is also proportional to the number of taps, since a small misalignment in each tap coefficient would add to the error in generation of a replica of the echo signal.

What an echo canceller does is the following: it generates the replica of an echo from the information that passes through the receiving path and subtracts it from the echo to be cancelled which is being transmitted along the transmitting, or return, path. Such arrangements are exemplified by U.S. Pat. No. 3,499,999, "Closed Loop Adaptive Echo Canceller Using Generalized Filter Networks", M.M. Sondhi, Mar. 10, 1970 and U.S. Pat. No. 3,500,000, "Self-Adaptive Echo Canceller", J. L. Kelly, Jr., et al., Mar. 10, 1970. Both consider the operation of a closed loop echo cancellation system for use in two-way communication circuits. The Sondhi invention teaches the use of a generalized filter network which has as one input the voice signal on the incoming path to the four-wire to two-wire transformation junction and has, as a second input, an error signal which provides the feedback input necessary to correct the echo signal replica. This replica is subtracted from the outgoing signals thus reducing the echo amplitude. The residual echo is the differential which is the error signal. The Kelly et al. invention accomplishes a similar result but generates a replica of the echo by synthesizing a linear approximation to the echo transmission path by means of a transversal filter. The replica signal is subtracted from the return signal, and as with the Sondhi echo canceller an error signal (residual echo signal) is obtained. A closed loop error control system is employed and it is self adapting in that it automatically tracks variations in the echo path which may arise during a conversation, for example, as additional circuits are connected or disconnected. A somewhat different technique is disclosed in U.S. Pat. No. 4,232,400, "Echo Control System", S. Yamamoto et al., Nov. 4, 1980, in which regression coefficient calculators and predictors are used in the generation of an echo replica. To simplify the generation of the replica and thus improve echo cancellation, this invention effects a "whitening" characteristic to the input signal.

SUMMARY OF THE INVENTION

An echo canceller comprises an end delay analyzer, a variable delay, an echo synthesizer and a summation circuit. The end delay analyzer, in response to a signal on a receiving path and the echo return signal, provides a control signal which is applied to the variable delay and in response thereto an amount of delay is set. Because the variable delay is serially connected between the receiving path and an input to the echo synthesizer, the received signal is delayed by the set value, before it is applied to the echo synthesizer. The output of the synthesizer is connected to one input of the summation circuit and the echo return signal is applied to another input. A residual signal, at the output of the summation circuit indicates incomplete cancellation and this signal is fed back to the echo synthesizer so that adjustments may be made, and a more nearly accurate echo replica signal obtained at the output of the synthesizer.

BRIEF DESCRIPTION OF THE DRAWING

FIG. 5 is a block diagram of a circuit which shows how the comparisons are made in COMDEC (200) of FIG. 4 to obtain the index when scaling is used to avoid infinite growth of $W_m^i$;

FIG. 6 is a block diagram illustrating a preferred way to derive the delay index and illustrates how double-talk contamination may be avoided;

FIG. 7 is a block diagram which illustrates how the variable delay of circuit 40 may be achieved; and Table I graphically illustrates how the variable delay is set using the delay index as shown in FIGS. 6 and 7.

DETAILED DESCRIPTION OF THE INVENTION

Figure 1:
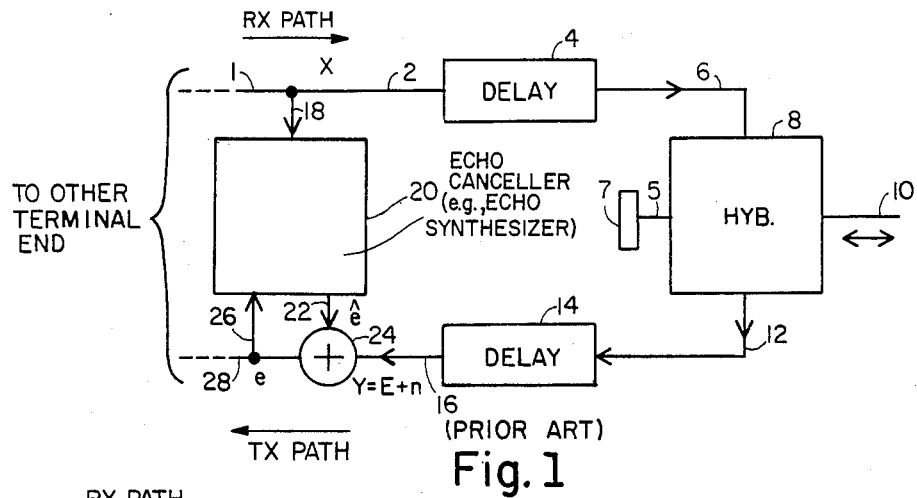
FIG. 1 is a block diagram which illustrates the general physical relationship between an echo canceller (20) and an associated four-wire and two-wire transformation circuit, which would normally exist between the canceller and a subscriber station set.

A generalized configuration of an echo canceller and its position within a communication circuit is illustrated in FIG. 1. Only one end of the transmission circuit is shown in the figure; but it is to be understood that the circuit extending from paths 1 and 28 to the left could encompass a satellite communications circuit and a short or long terrestrial path subsequent thereto before arriving at a hybrid network such as shown at 8 and a two-way communication path such as 10. Both communication paths such as 10 would normally end at a subscriber's telephone station set. The echo canceller 20 (which is typically referred to as echo synthesizer) is designed to operate within the four-wire path of the communications circuit. While it is possible for these echo cancellers to be located near the subscriber location, it is readily apparent that by such positioning an inordinate number of such cancellers would be required in the total telecommunications network. Thus the savings which may be effected because of the simplicity of the echo canceller are very rapidly lost because of the number of cancellers which may be required. In order to overcome this problem, echo cancellers are most commonly employed at locations proximate satellite ground stations, thus making them available to a plurality of circuits throughout a large service area. One problem introduced by this use is the complexity of the echo canceller which manifests itself in the number of taps required for an effective finite impulse response (FIR) filter. This comes about because the delay which must be accounted for in developing the echo replica is in large measure related to the length of the circuit between the location of the echo canceller and the four-wire to two-wire junction, and this is illustrated by delay elements 4 and 14. For example a circuit approximately one thousand miles in length would provide a round trip delay in the order of 25 milliseconds which, in turn, would require something over 200 taps in an FIR or transversal filter. It should be understood, however, that the use of the minimum number of taps would not necessarily provide the desired convergence with sufficiently small residual error and, thus, a much greater number of taps are often employed.

Referring again to FIG. 1 the manner in which two-way transmission is carried out may be visualized. A local circuit such as 10, which is typically a conventional 2-wire telephone circuit connected to a subscriber station is connected via hybrid 8 to an end of a four-wire communication circuit that includes the two separate 2-wire circuits 6 and 12. As is well known, the hybrid network provides a one-way path for voice currents from circuit 10 to outgoing circuit 12 and a separate one way path for incoming currents from circuits 6 to local circuit 10. Hybrid balance is effected in so far as practical by balancing network 7 which is connected to hybrid 8 via path 5. The outgoing currents from path 10 would pass through hybrid 8 and onto path 12, delay circuit 14, and summing circuit 24 to path 28, and to the far end terminal where they would pass through a similar network such as shown in FIG. 1. The incoming received transmissions from the far terminal may appear on path 1 as either digital or analog signals. These signals are represented by the symbol X. The incoming signal passes along path 2, delay circuit 4 and path 6 to the hybrid 8 which functions to pass the incoming signal on to path 10 to be used by the subscriber station. Because the balancing network 7 does not completely match the impedance of the local circuit 10, a portion of the incoming signal is passed through hybrid 8 to path 12, delay 14 and path 16 to summing circuit 24. This is the echo signal which in conjunction with any noise or information signals from the local subscriber on path 10 are represented by the symbol Y. With respect to the echo signal portion, represented by the symbol E, suppression is required. But as we previously noted, in the long haul circuits associated with satellite communications, suppresion should not be obtained by opening the return path but should be obtained by some form of cancellation.

It is the function of echo canceller 20 to develop a replica, shown as ê on path 22, of the incoming signal and to provide such replica on a timely basis to summation circuit 24 in such form that the echo will be substantially reduced. Any residual echo existing after the summation process is shown as e associated with path 28, and a portion of this signal is fed back along path 26 to echo canceller 20 to improve the replica characteristic so that it more closely approximates that of the actual echo signal.

It has been discovered that the impulse response characteristic of the circuit between an echo canceller 20 and its associated subscriber station can be represented as a pure delay and a relatively small time dispersion. Further, experiments have shown that the number of taps required for representing the time dispersion of the impulse response is only 48. Thus the implementation of such a discovery would lead to a significant improvement in the complexity of the echo canceller circuit.

Figure 2:
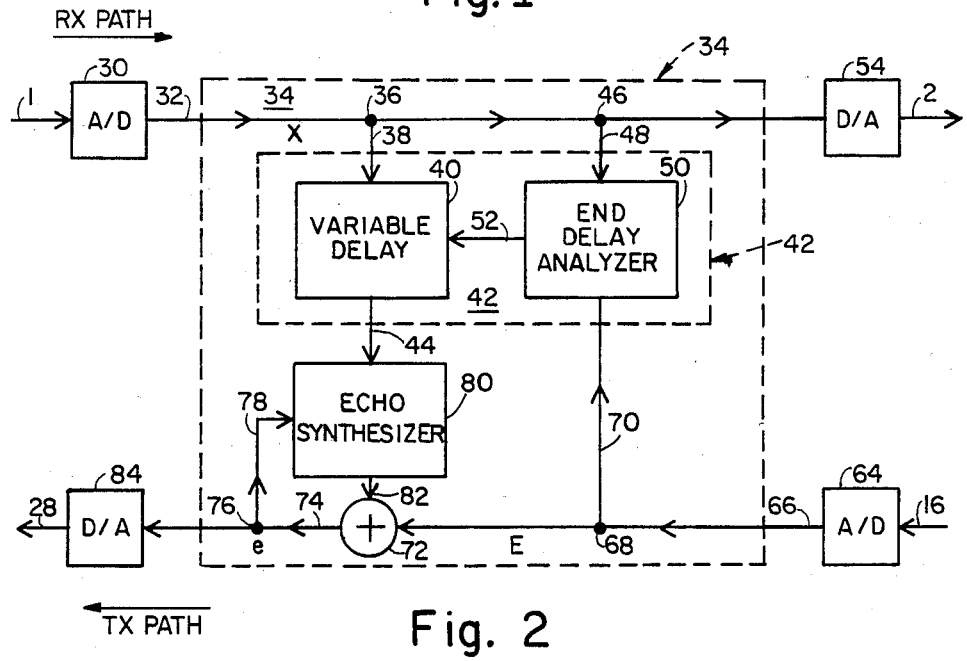
FIG. 2 is a block diagram which illustrates the general configuration of an echo canceller (34) of the instant invention.

Referring now to FIG. 2 the general configuration of an echo canceller 34 embodying the elements of the instant invention are illustrated. Because a preferred embodiment of the invention employs digital techniques an A-to-D converter 30 is inserted in the receiving path 1 and a D-to-A converter 54 between the echo canceller 34 and the outgoing path 2 of the receiving circuit, and in the transmitting circuit an A-to-D converter 64 is inserted in the path 16 and a D-to-A converter 84 between the echo canceller 34 and the outgoing path 28 of the transmitting path. If the signals on paths 1, 2, 16 and 28 are already in digital format such converters would not be required. Further, as will be shown subsequently, the invention may be employed directly in an analog circuit facility. The received signal X passes along path 32 and through D-to-A converter 54 to path 2. At junction 36 the path 38 is bridge-connected to the receiving path so that a selected portion of the signal X may be applied to variable delay 40, and at junction 46, path 48 is bridge-connected to the receiving path 32 so that a portion of the received signal X may be applied to end delay analyzer 50. In the transmitting path, neglecting the effects of noise and local speaker conversation signals, the echo return signal E passes along path 66 to summation circuit 72. At junction 68 the path 70 is bridge-connected to the transmitting path 66 so that a portion of the echo return signal is applied to a second input of end delay analyzer 50.

Before continuing with the description of the invention the effect of local speaker conversation signals should be considered. Generally these local speaker signals would be at a level which is considerably higher than the echo return signal. Therefore, such signals could adversely affect the value of the echo replica because of the immediate and significant change in the amplitude of the error signals e resulting from the summation in summer 72. Although this invention does not address that particular problem, it should be understood that the status of the echo synthesizer adjustments would be "frozen" in the event that the local subscriber would respond to the statements or questions of the remote talker. This is normally termed a "double-talking" condition. The difference between the amplitude of the echo and that of the local subscriber is normally significant. In part, this is because of the loss experienced by the incoming signal as it passes through the four-wire to two-wire transformation junction. This loss should be no less than 6 dB and is usually in the order of 15 dB. Because of this differential, the presence of double-talking can be readily identified and circuits can be opened or otherwise modified so as to prevent the presence of conversation signals from the local subscriber from adversely affecting the echo replica. In the following discussion of the instant invention the issue of a double-talking situation will not be further considered in detail, and it will be assumed that the only signal present in the transmitting path will be echo and/or any noise components which might exist on the communication path.

Reverting back to FIG. 2, end delay analyzer 50 accepts a portion of the incoming signal X on path 48 and a portion of the echo signal E on path 70 and compares the later with the delayed versions of the former until a "match" is made and the result of this comparison is a control signal which is applied via path 52 to set the delay of variable delay 40 so as to compensate for the passive portion of the end delay between the echo canceller and the four-wire to two-wire transformation junction. That portion of the incoming signal which is applied via junction 36 to path 38 now encounters this set amount of delay and the delayed signal is applied via path 44 to echo synthesizer 80. The echo synthesizer is essentially a transversal filter as disclosed in the patents referenced hereinabove. In order to subtract from the echo signal, E, on path 66, the echo replica ê (on path 82) is converted to the negative of the actual replica so that, when it is algebraically added to the echo in summer 72, the amplitude of the echo is substantially reduced and the residual appears as an error signal e on path 74. A portion of this error signal is applied via junction 76 and path 78 to echo synthesizer 80 and it is this feedback information which permits adjustment of the echo replica so as to more closely approximate the actual echo signal. For synthesizing the echo replica, the coefficients are updated by using a least mean square algorithm as is commonly known. It should be understood however that calculations are performed only for the active part of the impulse response. It has been determined that only 64 taps are required for many applications. The advantage of having fewer taps is that the number of multiplications is reduced considerably. For example in the case of 64 taps, the number of multiplications per second is equal to 512,000; and even for a very long end delay the computation requirement does not increase.

In order to determine the end delay we can use the input signal (X) and the output or return signal (Y) by correlating the input and return samples to determine the index (or time) at which a mean maximum value occurs. In this case analog to digital and digital to analog converters are employed, assuming that an analog signal is present in the communication path, and sampling would be in accordance with the sampling theorem, i.e. at a frequency which is twice the highest frequency of interest in the passband.

Figure 4:
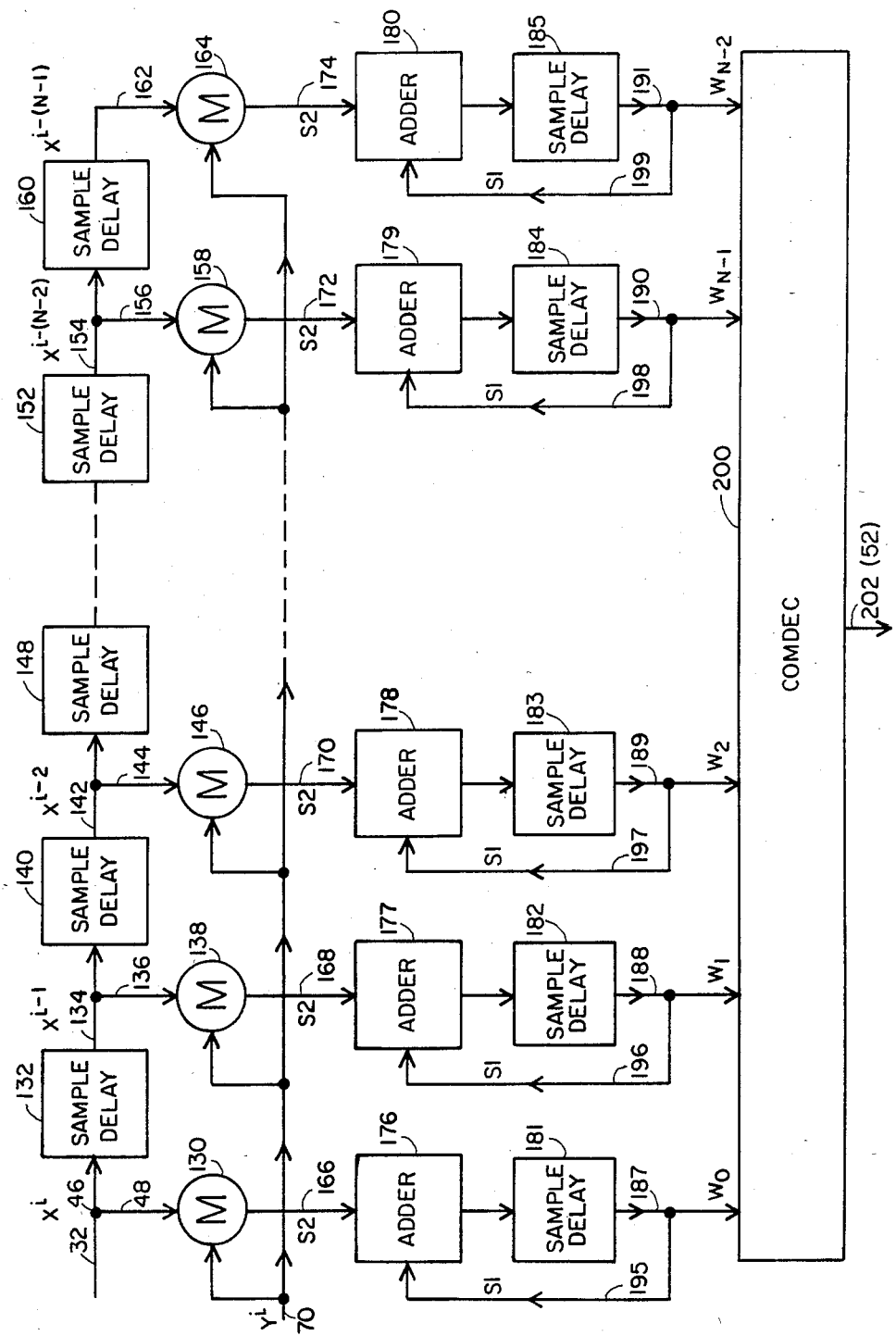
FIG. 4 is a block diagram which illustrates in more detail a circuit implementation of end delay analyzer (50)

Referring to FIG. 4 it may be seen that the input signal X is represented by digital samples $X^i$ and these samples are applied via path 32 to an input of sample delay 132. This ith sample is delayed by an amount which is equal to the sampling interval, before the sample appears at path 134. The delayed sample is characterized by the sample designation as $X^{i-1}$. The incoming input sample $X^i$ also is applied via junction 46 and path 48 to one input of multiplier 130. The digital output, or return signal, samples $Y^i$ are applied via path 70 to one input of each of the multipliers 130, 138, 146, . . . 158, and 164, simultaneously. Thus the output of multiplier 130 is the product of the current digital input signal sample $X^i$ and the current digital return signal sample $Y^i$, whereas the subsequent multiplications are between the current return sample $Y^i$ and an input signal which has been delayed, respectively, by 1, 2, . . . N-1 sample intervals. This is done so that a correlation may be obtained between the return signal (echo signal) and the incoming signal delayed by an appropriate amount. The point at which the delayed input and the return signal are at a maximum is a measure of the end delay of a circuit connected to the echo canceller. In order to determine this location or index it is necessary to correlate each of the outputs, one with the other, until the delay location for the maximum correlation is obtained. This is done in comdec 200 in which the product samples are compared and a decision is made with respect to the correlation of the samples in order to obtain a "match". The output signal on line 202 corresponds to the signal on line 52 of FIG. 2.

A "match" occurs when we have substantially approximated the end delay. In order to find the delay we make use of the following algorithms.

$$W_m^i = W_m^{i-1} + (x^{i-m})(Y^i) \quad (1)$$

where, m = 0, 1, 2, 3 . . . N−1, and
i = sample index.

In this case the search is for the maximum sample amplitude appearing during a sample interval as noted above which occurs along with a maximum value of m and is representable mathematically as $$\max/m |W_m^i| \tag{2}$$

which means that one desires the maximum value of m for which the absolute value of the quantity $W_m^i$ is a maximum value where the index m will be a measure of the end delay. Rather than using the absolute value, any convex function can be used; for example, squaring can be used. By using this approach the $W_m^i$'s grow indefinitely. In order to prevent this indefinite growth, an exponential scaling factor, $S = 1 - 1/L_1$ is used and $L_1$ is chosen to be a power of 2 so that the hardware implementation can be simplified. Now, rather than using $(X^{i-m})Y^i$, we can use sign $(X^{i-m})$ sign $(Y^i)$ and this somewhat simplifies the hardware implementation because Exclusive-OR gates rather than multiplication may be employed, where sign $(Y^i)$ is either $+1$ or $-1$ depending on the sense or sign of the digital signal sample $Y^i$. Thus we have:

$$W_m^i = W_m^{i-1}(1 - 1/L_1) + \text{sign}(X^{i-m}) \text{sign}(Y^i/L_2) \tag{3}$$

where, $L_2$ is a constant like $L_1$ and is chosen so that the correction term becomes a least significant bit of $W_m^{i-1}$.

Figure 3:
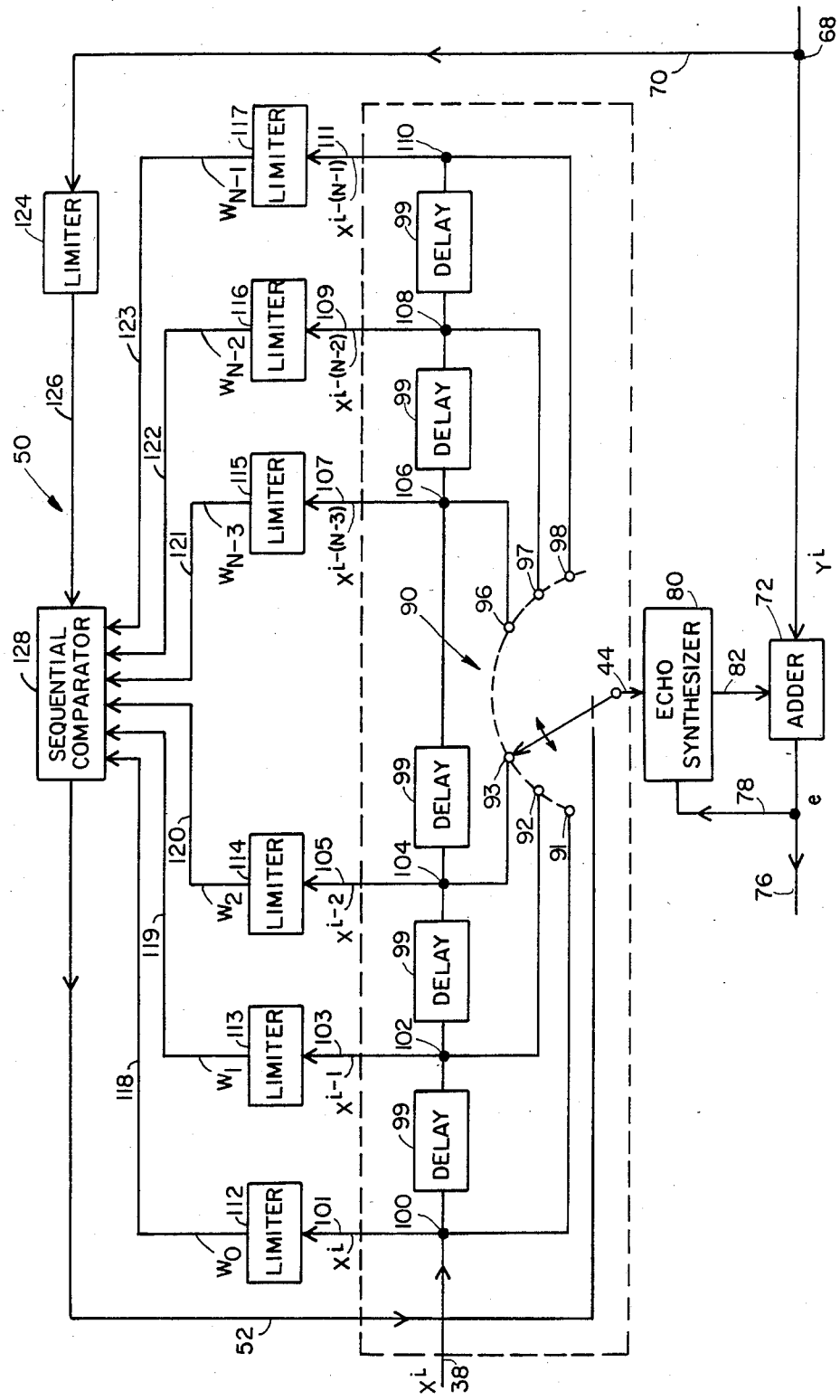
FIG. 3 is a block diagram of a preferred embodiment of an echo canceller 20 in accordance with the invention and illustrates the manner in which the delay index may be obtained in a digital version of the invention.

Referring to FIG. 3 a block diagram is shown which illustrates in more detail the manner in which the circuit structure 42, which includes the end delay analyzer and the variable delay, operate in response to the incoming and echo signals to provide an end delay measurement and insert a set delay between the incoming signal and the echo synthesizer. The bridged signal input is applied via path 38 to node 100 where it is passed onto a number of delays labled 99 each of which provide an equal delay interval. For digital signals, the delay for each is equal to the sampling interval, and a sufficient number of delay's 99 are employed to compensate for the anticipated end delay. Thus, the incoming signal experiences one, two . . . N-1 sampling interval delays in passing through to node 110. The delayed signals are separately applied to terminals 91 through 98, respectively, and via paths 101, 103, 105, etc. to their respective limiters numbered 112-117. The output of each of the limiters 112-117 is applied to an input of sequential comparator 128. In addition the echo signal 70 is applied via path 70, limiter 124, and path 126 to another input of sequential comparator 128. The various delayed signals are sequentially compared to a present value of the echo signal and the comparisons are related one to the other in order to determine when a "match" occurs, i.e., the delay at which a maximum amplitude is obtained. Once this has been determined, a control signal 52 is applied via path 52 to delay control 90, whereby the input connection 44 to echo synthesizer 80 is connected to that one of the terminals 91-98 which has the delay corresponding to the "match" condition. In the FIG. 3 the manner in which the adjustment of the delay is made is shown symbolically by 90 as a sliding connection such as may be done mechanically. The limiters 112-117 and 124 shown in the FIG. 3 are termed hard limiters such that the output signal is in effect binary in nature and in the simplist case a "match" would occur only between the delay signal and the echo signal at the time both of them appear to be a 1. The key to this structure is in the delay measuring circuits, and for these we use the following algorithm:

$$W_k^{L+1} = W_k^L + \text{sgn}(X_{L-k})\text{sgn}(Y_L) \tag{4}$$

where,
k=0, 1, 2, ... N-1 for an N tap echo canceller, and
L=the index, and for voice circuits it is based on the 8 kHz sampling rate.

Here again the maximum sample amplitude and index are representable as $$\max/k |W_k^{L+1}| \tag{5}$$

Rather than using the absolute value, any convex function may be used. For example by squaring, the sensitivity for decision can be increased at the expense of the use of a squaring technique.

The algorithm measures the correlation between input and output recursively, and finds the location of largest correlation. While the true correlation is $$1/L \Sigma X_{L-K} Y_L = W_K \tag{6}$$

only the sign correlation seems to have sufficient information so that the largest correlation coefficient can be identified.

After identifying the location of the peak of the impulse response, a proper windowing is necessary to cover the active part of the impulse response. The filters used before and after the A-to-D and D-to-A converters are generally of the minimum phase type, and these have a fairly large delay distortion near the band edge. As a result of this type of transfer function the impulse response is squeezed toward the front and decays slowly after the peak. To compensate for this effect a greater number of taps must be provided for after the peak rather than before the peak.

One problem with the algorithm as presented is that it continues to grow indefinitely. In order to prevent this effect, the algorithm may be modified by scaling as follows:

$$W_k^{L+1} = (1 - 1/N)W_k^L + 2^{-N}\text{sgn}(X_{L-k})\text{sgn}(Y_L) \tag{7}$$

where, N is the number of taps for the whole impulse response, and k identifies the tap number as previously noted.

By using this algorithm the first term on the right hand side of the equation is incremented or decremented by the least significant bit depending upon the sign of the product of sgn $(X_{L-k})$ and sgn $(Y_L)$ where sgn $(X_{L-k})$, for example, is either $+1$ or $-1$ depending on the sense or sign of $X_{L-k}$. A different implementation is possible. Rather than using $(1-1/N)$ scaling it would be possible, for example, to clear $W_k$ at a proper time interval, say at $k=N$, and start updating $W_k$ immediately thereafter. A problem with this method is that the previously identified peak location must be retained for a certain period of time. This is because it takes time for the delay identification and determination of the correct value of delay.

Figure 5:
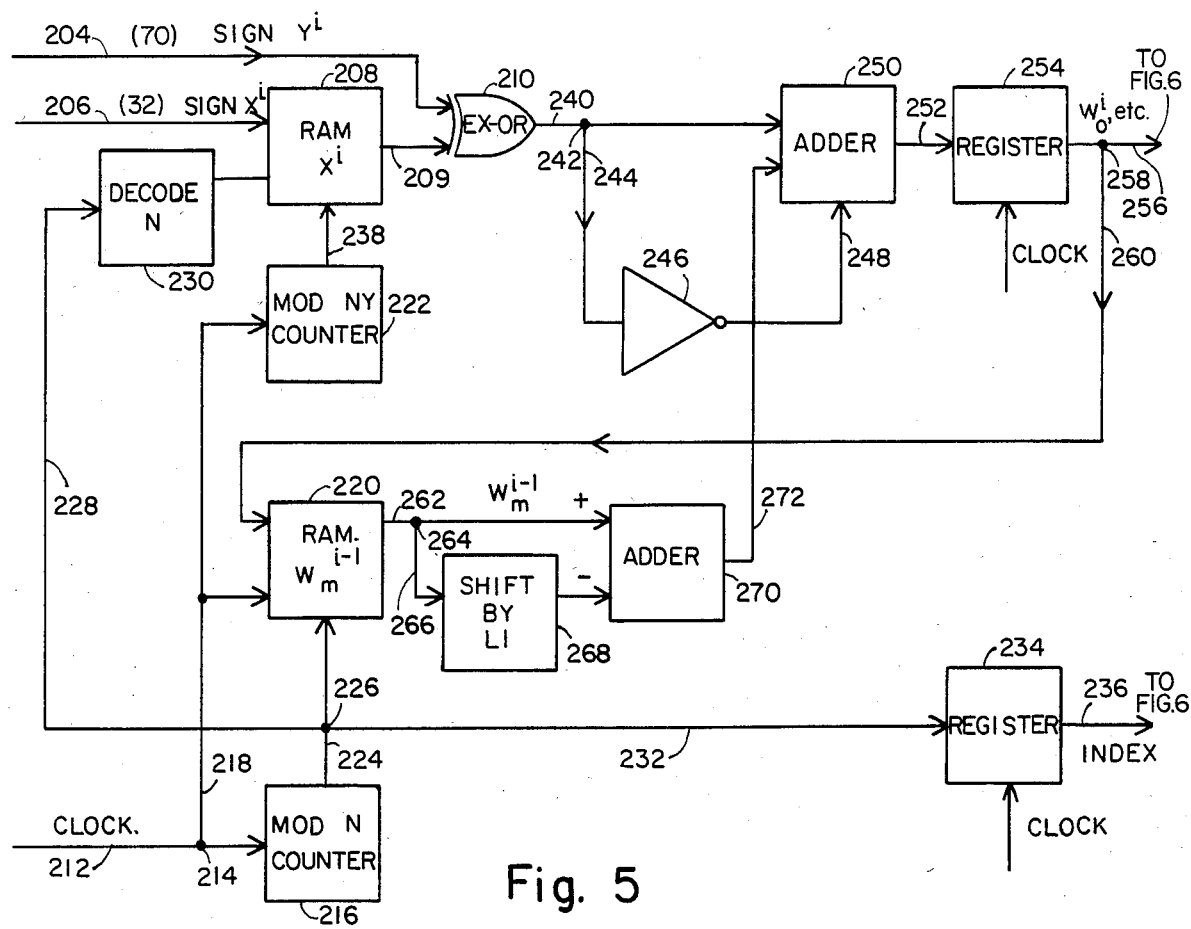

A particular implementation of algorithm (3) is illustrated in FIG. 5 and the scaling factors $S_1 = 1 - 1/L_1$ and $S_2 = 1/L_2$ have been implemented by proper shifting. Sign bits for the present and delayed samples of $X^i$ on line 32 are applied on line 206 to and are stored in the random access memory (RAM) 208. Similarly, sign bits for samples of $Y^i$ on line 70 are sequentially applied on line 204 to gate 210. The $W_m$'s are stored in RAM 220. The $X^i$'s and $W_m$'s are sequentially read out for computing equation (3). At the same time, the Mod N Counter 216 provides the index for delay to RAM 220. The scaling factors $L_1$ and $L_2$ are obtained by using the shift and add operations as shown.

Figure 6:
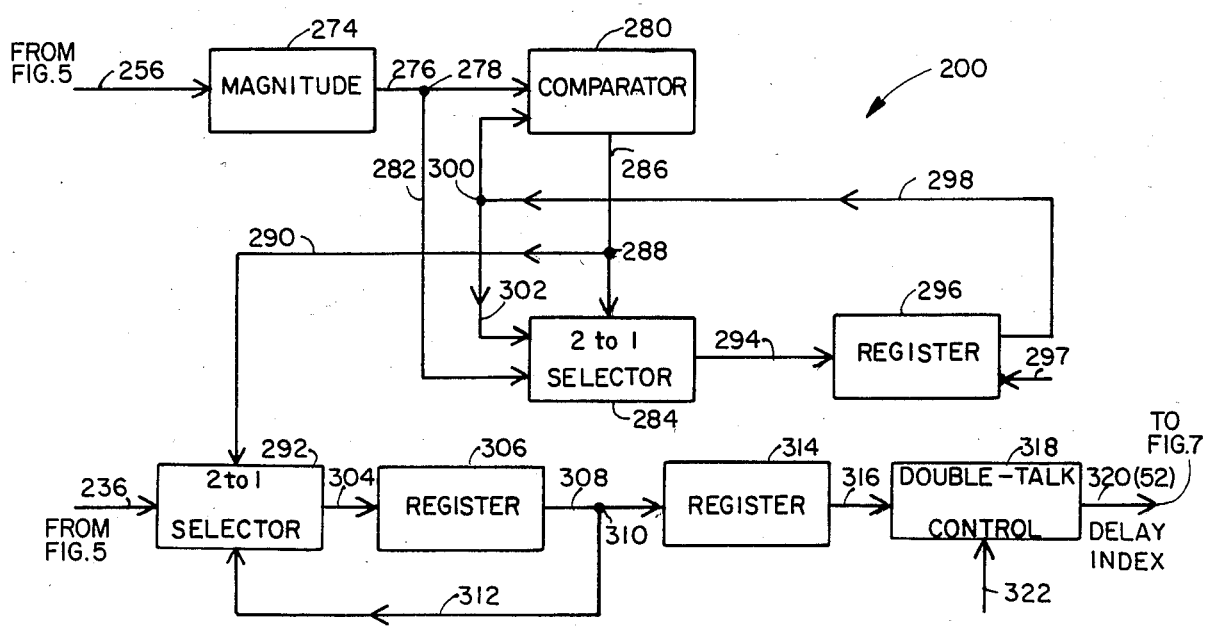

A preferred form of comdec 200 as shown in FIG. 4 is illustrated in FIG. 6. Here the compare and decision circuit 200 accepts the amplitude outputs from path 256 of FIG. 5 and, initially, when $W_0$ comes into the comparator, register 296 is cleared by an input on the clear input from path 297. The absolute value of $W_0$ passes through the 2 to 1 selector 284 and register 296. A 2 to 1 selector is a conventional integrated circuit such as a Model 74 157 encoder/decoder. The 2 to 1 selector 284 in FIG. 6, for example, is responsive to a binary signal on line 286 for passing one or the other of the digital input signals on lines 282 and 302, as is described more fully hereinafter. At the next clock time the absolute value of $W_1$ comes into the comparator 280 and it will be compared with the absolute value of $W_0$ because of the feedback via path 298 and junction 300 to the comparator 280 input from the output register 296. The signal element having the larger amplitude will pass via path 286 through selector 284 and path 294 to register 296. This sequential comparison technique will be repeated until the maximum absolute value $W_{N-1}$ appears at the input to the comparator 280.

Referring now to the index input at path 236 it may be seen that comparator 280, 2 to 1 selector 292 and register 306 form another comparison loop as was described hereinabove for the magnitudes, thus a similar operation is performed for the indexes. At the end of the evaluation period, i.e., when $W_{N-1}$ has been compared, the delay index is sampled by register 314 which provides the index for the sample having the maximum amplitude. Because this index actually relates directly to the sample delays, it is a measure of the end delay, and therefore tells us just what the delay is between the echo canceller and the four-wire to two-wire transformation device.

As was previously noted the index can be severely distorted because of the presence of the speech from the local talker during double-talk situations. Although not forming a part of this invention a double-talk control circuit is shown at 318 in the path from the output of register 314 along path 316. The input on path 322 is from a device which would detect the presence of speech on the outgoing path, other than echo, and when such speech is present a control signal would be applied via path 322. In the event that double talking occurs double talk control 318 would simply hold the index previously determined and apply this index via path 320 for the circuits which will be described later. When there is no double talk present double talk control 318 would be permitted to pass the index that is derived by this circuit arrangement and which is outputed on path 316 from register 314.

Now that the end delay has been determined, in the form of the delay index, i.e., a control signal, it is necessary to convert this delay index (control signal) into the actual delay which the incoming signal should experience in passing through variable delay 40 as shown in FIG. 2.

Figure 7:
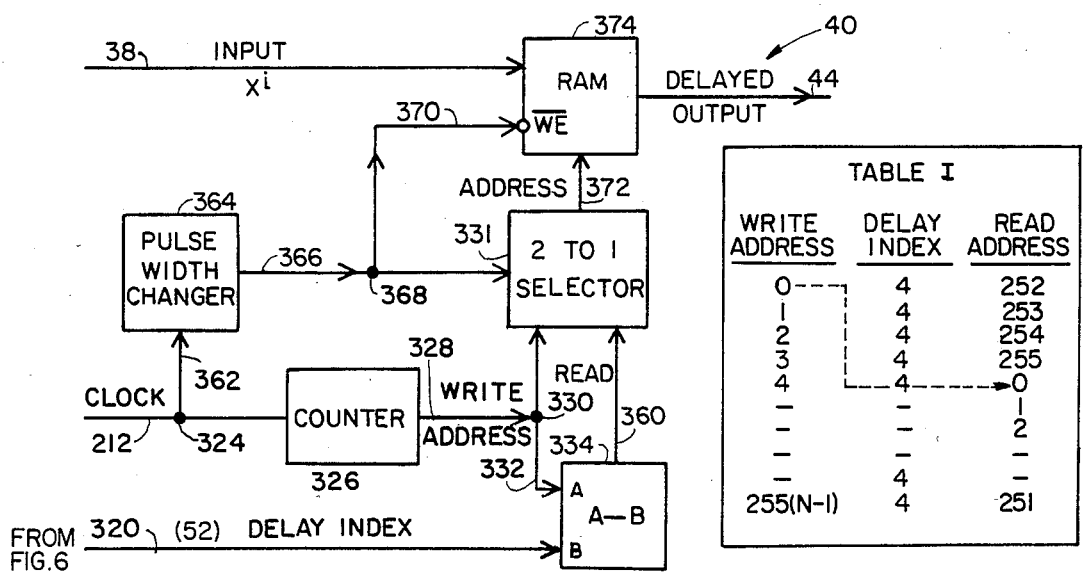
FIGS. 5, 6 and 7 in combination illustrate an alternate embodiment of the end delay equalizer 42 in FIG. 2 in accordance with Equation (3)

Referring now to FIG. 7 a manner in which this is accomplished may be understood. The clock signal is applied via path 212 and as in the preceeding use this clock signal provides the sampling interval based upon the sampling theorm and is applied first via junction 324 to counter 326, which counter is set to provide the number of count intervals desired, and these are normally equal to the number of tap intervals required for the particular usage. Very often the number of tap intervals is in the order of 256, i.e., 0–255. The output of the counter 326 on path 328 provides the write address to junction 330 and thence to 2 to 1 selector 331. The write address is also applied via path 332 to the A input of A-B subtractor 334. The delay index, from path 320, FIG. 7, is applied to the B input of the subtractor 334 and the read output is then applied via path 360 to a second input of 2 to 1 selector 331. Selector 331 is periodically pulsed at the clock rate via junction 324, path 362, pulse width changer 364, path 366 and junction 368. From junction 368 this clock pulse information is applied via path 370 to an inhibit input of RAM 374. The index address is applied via path 372 to a second input of RAM 374 and this read address sets the delay for the $X^i$ incoming on path 38 so as to obtain the desired end delay. The delayed incoming signal appears on path 44 and is then applied to echo synthesizer 80. An example of how this is accomplished is illustrated in Table 1.

What is claimed is:

1. In a communication system having first and second one way transmission paths, an echo canceller which comprises:

an end delay analyzer circuit having first and second inputs electrically connected to the first and second paths, respectively, and providing a control signal at an output, which signal is a measure of an end delay;

a variable delay circuit having one input electrically connected to said first path, having a second input receiving said control signal and being responsive thereto to adjust said variable delay so as to provide at an output thereof a delayed sample of a first path signal with a delay that is equal to said end delay;

transversal filter echo synthesizer means responsive to said delayed sample of the signal on said first path and producing an output signal; and means connected in said second path for algebraically combining signals in said second path with the output signal from said echo synthesizer means; said synthesizer means being responsive to an algebraically combined signal at an output of said combining means for providing an echo replica signal as the output signal of said synthesizer means;

said end delay analyzer further comprising:

first means for limiting current and delayed signal samples from said first path;

second means for limiting a signal from said second path; and sequential comparator means for comparing the limited signals from said first and second limiting means to determine the delay location at which a maximum correlation, i.e., a match, is obtained.

2. An echo canceller as in claim 1 wherein said delay analyzer operates in accordance with the following algorithm $$W_m^i = W_m^{i-1}(1-1/L_1) + \text{sign}(X^{i-m})\text{sign}(Y^i/L_2),$$

where W represents a weight, m is an index, i is a sample index, $L_1$ and $L_2$ are constants, $X^i$ is an input signal sample, and $Y^i$ is a return signal sample, to measure the correlation between the first and second paths recursively, in order to determine a "match", and provide a delay index therefor.

3. An echo canceller as in claim 2 wherein said variable delay circuit comprises:
   a clock;
   a counter responsive to said clock for providing a count interval;
   a subtractor responsive to both the count interval and said delay index for providing a read output;
   a selector responsive to said clock pulse for coupling said read output from the subtractor as an address signal; and
   means for storing the sampled inputs from said first path and responsive to the address signal for providing as delayed outputs signal samples in said storing means in accordance with said end delay as characterized by said delay index.

4. An echo canceller as in claim 3 wherein said selector is a 2 to 1 selector.

5. An echo canceller as in claim 4 wherein said means for storing is a random access memory (RAM).

6. In a communication system having first and second one way transmission paths, an echo canceller which comprises:
   an end delay analyzer circuit having first and second inputs electrically connected to the first and second paths, respectively, and providing a control signal at an output, which signal is a measure of an end delay;
   a variable delay circuit having one input electrically connected to said first path, having a second input receiving said control signal and being responsive thereto to adjust said variable delay, so as to provide at an output a delayed sample of a first path signal with a delay that is equal to said end delay;
   transversal filter echo synthesizer means responsive to said delayed sample of the signal on said first path and producing an output signal; and
   means connected in said second path for algebraically combining signals in said second path with the output signal from said echo synthesizer means; said synthesizer means being responsive to an algebraically combined signal at an output from said combining means for providing an echo replica signal as the output signal of said synthesizer means;
   said end delay analyzer further comprising:
   means for sequentially delaying samples of the first path signal;
   means for multiplying said delayed signal samples with a current signal sample from said second path; and
   means for comparing said multiplied signal samples to determine the delay location at which there is a maximum correlation, i.e., a match, and provide a delay index thereof;
   said variable delay circuit further comprising:
   a clock;
   a counter responsive to said clock for providing a count interval;
   a subtractor responsive to both the count interval and said delay index for providing a read output;
   a selector responsive to said clock pulse for coupling said read output from the subtractor as an address signal; and
   means for storing sample inputs from said first path and responsive to the address signal for providing as delayed outputs signal samples in said storing means in accordance with said end delay as characterized by said delay index.

7. An echo canceller as in claim 6 wherein said selector is a two to one selector.

8. An echo canceller as in claim 7 wherein said means for storing is a random access memory (RAM).

* * * * *